United States Patent [19]

Hoadley

[11] 4,123,186

[45] Oct. 31, 1978

[54] TOOL FOR MACHINING CLAY

[75] Inventor: Frederick E. Hoadley, Dearborn, Mich.

[73] Assignee: Ford Motor Company, Dearborn, Mich.

[21] Appl. No.: 794,585

[22] Filed: May 6, 1977

[51] Int. Cl.² .............................................. B26D 1/12
[52] U.S. Cl. ...................................... 407/54; 408/230
[58] Field of Search .................... 407/53, 54; 408/210, 408/230

[56] References Cited

U.S. PATENT DOCUMENTS

| 2,328,629 | 9/1943 | Eich et al. ............................ 408/230 |
| 2,887,136 | 5/1959 | Rathgeber ............................ 407/54 |
| 3,443,459 | 5/1969 | Mackey et al. ....................... 408/230 |

FOREIGN PATENT DOCUMENTS 612,288   11/1948   United Kingdom ..................... 408/230

*Primary Examiner*—Leonidas Vlachos
*Attorney, Agent, or Firm*—Donald J. Harrington; Keith L. Zerschling

[57] ABSTRACT

A milling tool for machining clay in the formation of clay models comprising a cutting portion with a sharp point adapted to be guided over the surface of a clay block to produce characteristic lines at a predetermined depth prior to removal of excess clay at depths substantially equal to or less than the penetration of the tool wherein provision is made during the cutting operation for removal of clay chips to produce a clean continuous groove that results in a precise, continuous character line on the clay model following removal of the excess clay.

4 Claims, 3 Drawing Figures

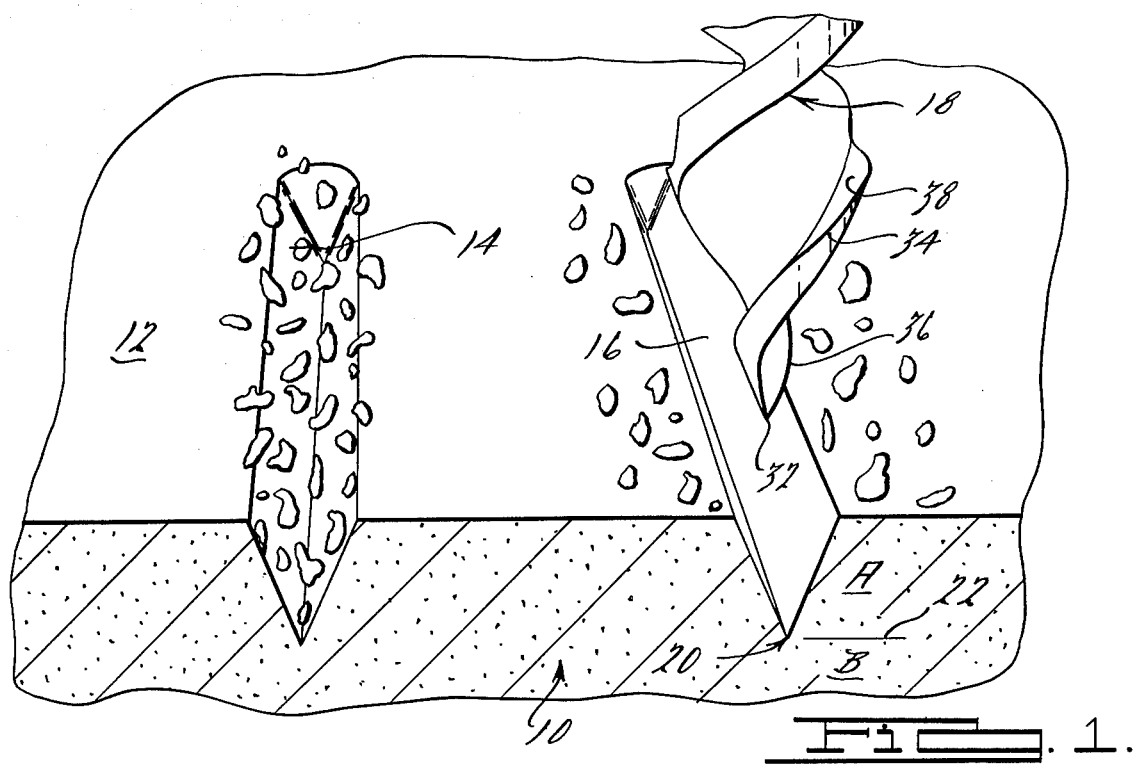
FIG. 1.
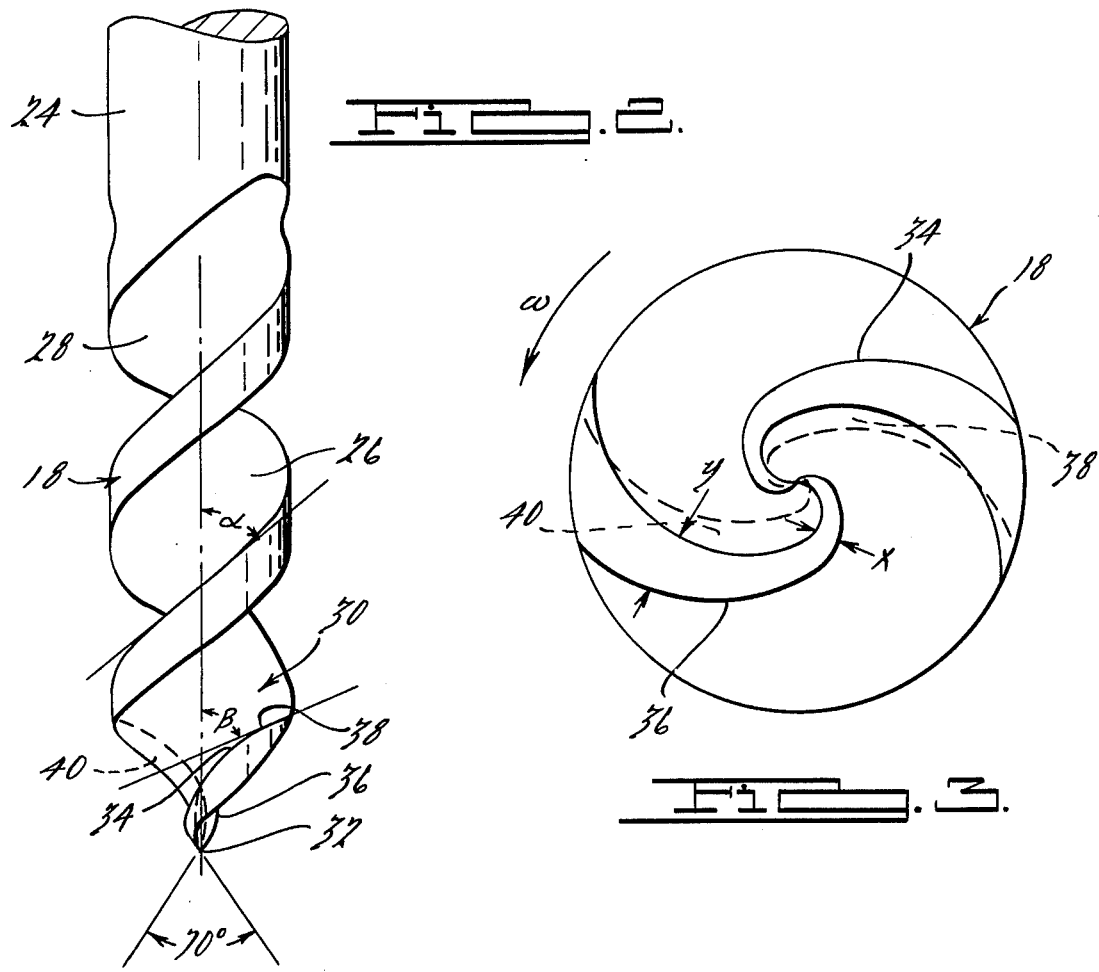
FIG. 2.
FIG. 3.

TOOL FOR MACHINING CLAY

BRIEF DESCRIPTION OF THE INVENTION

In the manufacture of dies using numerical control techniques it is common practice to form a clay model of a finished part. Characteristic boundary lines and character lines at critical areas of the model surface where changes in slope or direction occur are produced so that a line follower or scanner can be used to develop point data or coordinates of points along the lines. Those coordinates, in turn, can be used as input data for the control system for a numerically controlled machine tool such as a multiple axis milling machine during the machining of a metal replica of the clay model.

The tool of my invention is adapted to form grooves of predetermined depth in a clay block as it is moved across the surface of the clay. The tool serves as a milling cutter, and it is provided with a pointed tool with a shape that will avoid undercutting when the angle of the tool changes during the cutting operation. That is, the tool will not remove clay from a depth below the depth of the point of the tool when the angle of the tool changes as the tool traverses, for example, a corner on the clay model or an area in which the surface of the clay changes slope. When moving the tool over the surface of the clay, undercutting is avoided also when corners and critical surfaces of the clay block are traversed even when the angle of the tool is not changed sufficiently to accommodate the changed surface slope.

It is possible to maintain a sharp point contact with the clay to produce a well-defined and continuous fine line on the clay model while still keeping a relatively high cutting edge angle on the tool. Provision is made for augmenting the lifting force on the clay chips to cause the chips to fly out of the groove without allowing the chips to collect along the edge of the groove. The presence of chips in the groove following the cutting action of the tool would make it impossible to maintain a clean, well-defined character line on the clay model during subsequent rough milling operation of the clay block. The vertical lifting force on the clay chips is achieved by a cutting surface on the tip of the tool having a compound angle so that the chips are drawn inwardly toward the axis of the rotating tool and are ejected vertically out of the groove by the force component developed by the wedging action of the cutting tip.

BRIEF DESCRIPTION OF THE FIGURES OF THE DRAWINGS

FIG. 1 is a view of a block of clay together with a cutting tool of my invention wherein a clean groove cut with my improved tool is shown in comparison with a groove that is cut with a tool of conventional design.

FIG. 2 is the cutting tool of my invention shown in side elevation.

FIG. 3 is an end view of the tool shown in FIG. 2.

PARTICULAR DESCRIPTION OF THE INVENTION

In FIG. 1 reference character 10 shows a clay block having a surface 12 in which are machined grooves such as those shown at 14 and 16. The groove 14 is typical of the grooves that would be formed using a pointed milling tool of conventional design. Groove 16 is typical of a groove that is machined using my improved milling tool.

The improved milling tool of my invention is shown in FIG. 1 at 18. It will be described with particular reference to FIGS. 2 and 3.

The apex 20 of the groove 16 is formed by the sharp edge of the cutter of my invention. It is machined at a predetermined depth, and it defines a characteristic line on the surface of the clay when the portion of the clay above the apex 20 is removed in a subsequent machining operation. In FIG. 1 the clay in the region identified by reference character A above reference line 22 is removed in a subsequent machining operation and the clay in the region B below the reference line 22 forms the body of the finished clay model. It may be observed by referring to FIG. 1 that the groove 16 is clean with well-defined sides, and it is not clogged with chips formed during the milling operation. This is in contrast to the groove 14, which is the result of a milling operation with a conventional milling tool. The characteristic line that would be formed on the surface of the clay model as a result of the machining of the groove 14 would be discontinuous and unreliable for scanning during the development of point data on a characteristic line for use by the control system of a numerically controlled machine tool, such as a multiple axis milling machine.

In FIG. 2 the tool 18 is formed with a shank portion 24 and with two spiral recesses or flutes 26 and 28. The tip of the tool which is identified by reference character 30 is formed with a point by grinding the tool with a tip angle to form a sharp point 32. The angle of the tip shown in FIG. 2 is 70° although other angles also can be used as desired depending upon the type of cutting operation that is desired.

The cutting action occurs at the tip 30. The cutting edges are shown at 34 and 36. There are two cutting edges, one for each of the flutes 26 and 28. The flutes are adapted to carry the chips away from the cutting edges in a vertical direction. It has been found, however, that the flutes themselves are incapable of carrying away the chips when the tool is cutting soft clay because of the density of the clay and its tendency to adhere to the sides of the groove formed by the cutting edges 34 and 36. In order to impart a lifting force to the chips and to expel them from the groove during machining operation, the tip of the tool is formed with secondary flats 38 and 40. One flat is located within each flute 26 and 28. These flats form an effective angle $\beta$ that is larger than the normal angle $\alpha$ which is the angle formed by a tangent to the side of the flute with respect to the axis of the tool. The flat 38 is ground to form a concavity, which causes the chip that is cut by the edge 34 to be drawn away from the side of the groove. The angle $\beta$ of the flat is such that a substantial vertical force component is imparted to the loose chip, thereby throwing it out of the groove, thus avoiding the clogging condition shown at numeral 14 in FIG. 1. The similar ground flat 40 is provided on the opposite side of the tool within the flute 26. The flute surfaces directly under the flats 38 and 40 are ground to reduce the thickness of the local flat thicknesses X and Y further.

When the surface of the clay is traversed, it is possible to form a continuous groove without starting and restarting the milling operation and without changing the angle of the tool substantially because the cutting edges 34 and 36 converge to a sharp point and the adjacent flute thickness gradually decreases until the flutes blend into the tip 32. Note FIG. 3, for example, where the dimension X for the cutting edge 36 is less than the dimension Y, and the same is true for the corresponding dimensions for the cutting edge 34. This prevents undercutting of the clay at discontinuities and changes in the slope of the surface of the clay. That is, the clay adjacent to the location of the apex point 32 does not undercut at a depth below the depth of the point 32. This characteristic, as well as the vertical lifting force feature mentioned previously, are achieved by the special geometry of the ground surfaces 38 and 40 adjacent each cutting edge at the tip 30.

Having thus described a preferred form of my invention, what I claim and desire to secure by U.S. Letters Patent is:

1. A milling cutter for machining soft material such as clay comprising a cylindrical shank adapted for rotation about its axis, flutes formed in said shank in the form of spirals extending along the axis of said shank, the tip of said shank being ground with an angle to form a point the apex of which falls substantially on the axis of said shank, each flute having a cutting edge ground on the side of the flute in the region of said tip, each cutting edge thereby having a lead-in surface that has an effective angle $\beta$ relative to the axis of said shank that is greater than the corresponding angle $\alpha$ formed by the spiral flutes, the ground surface adjacent the cutting edge progressively decreasing in width as the cutting edges converge toward the tip of said tool.

2. A milling tool for cutting grooves in clay comprising a cylindrical shank that would rotate about its geometric axis, spiral flutes formed in such shank and extending along the axis of said tool, the tip of said tool being formed with a sharp point, the cutting edges of said tool being located at said tip, opposed sides of each flute being ground to produce a cutting surface for each flute the sides of which form an angle $\beta$ with respect to the axis of said shank that is greater than the angle $\alpha$ formed by the corresponding surfaces of said flute on the body of said shank relative to said axis, the width of said surfaces adjacent to each cutting edge progressively decreasing as they converge toward the tip.

3. The combination as set forth in claim 1 wherein said shank has two spiral flutes, each flute being ground at its tip to produce a cutting edge whereby clay chips are removed from the surface of a body of clay and thrust outwardly in the direction of said axis away from the machined groove.

4. The combination as set forth in claim 2 wherein said tool is formed with two spiral grooves, the end of the tool being ground to a pointed tip, one cutting edge being associated with each spiral groove, opposed surfaces of each groove being ground to produce a converging groove thickness that merges toward said tip.

* * * * *